(12) United States Patent
Fuke et al.

(10) Patent No.: US 6,691,072 B2
(45) Date of Patent: Feb. 10, 2004

(54) MARK LENGTH SELECTION APPARATUS, MARK LENGTH SELECTION METHOD, MAXIMUM MARK LENGTH DETECTION APPARATUS, AND MAXIMUM MARK LENGTH DETECTION METHOD

(75) Inventors: Akihiro Fuke, Takatsuki (JP); Yushi Tamura, Nishinomiya (JP)

(73) Assignee: Matsushita Electric Industrial Co., Ltd. (JP)

( * ) Notice: Subject to any disclaimer, the term of this patent is extended or adjusted under 35 U.S.C. 154(b) by 107 days.

(21) Appl. No.: 10/058,224

(22) Filed: Jan. 29, 2002

(65) Prior Publication Data
US 2002/0111776 A1 Aug. 15, 2002

(30) Foreign Application Priority Data
Jan. 29, 2001 (JP) .......... 2001-019530

(51) Int. Cl.[7] .......... G06F 15/00; G11B 27/00
(52) U.S. Cl. .......... 702/189; 369/47.26
(58) Field of Search .......... 702/189, 190, 702/191, 33, 34; 369/47.26, 47.28, 44.32, 53.34, 53.31, 124.13, 124.14

(56) References Cited

U.S. PATENT DOCUMENTS 6,134,197 A * 10/2000 Ishibashi et al. .......... 369/44.32
6,330,213 B1 * 12/2001 Ishibashi et al. .......... 369/47.26

* cited by examiner

Primary Examiner—Bryan Bui
(74) Attorney, Agent, or Firm—Parkhurst & Wendel, L.L.P.

(57) ABSTRACT

A mark length selection apparatus is provided with a mark length measuring unit for measuring mark lengths of a signal which is read from an optical disc; a mark length selection unit for dividing one of continuous two mark lengths by the other mark length, which mark lengths are measured by the mark length measuring unit, and selecting some mark lengths from the mark lengths measured by the mark length measuring unit, on the basis of a result of comparison performed between a result of the division and a predetermined threshold value, and outputting the selected mark lengths; and a maximum mark length detection unit for detecting a maximum mark length that is the longest mark length among the mark lengths outputted from the mark length selection unit 120. Therefore, a maximum mark length can be detected while eliminating improper mark lengths which are caused by flaws or contamination on the optical disk.

11 Claims, 9 Drawing Sheets

MARK LENGTH SELECTION APPARATUS, MARK LENGTH SELECTION METHOD, MAXIMUM MARK LENGTH DETECTION APPARATUS, AND MAXIMUM MARK LENGTH DETECTION METHOD

FIELD OF THE INVENTION

The present invention relates to an apparatus and a method for selecting mark lengths of a signal which is read from an optical disc, and an apparatus and a method for detecting a maximum mark length.

BACKGROUND OF THE INVENTION

As a method for generating a clock for reading data from a recording medium such as an optical disc, there has generally been employed a method of generating a clock for reading data by comparing the clock and the data frequency, and performing control to make the both have the same frequency.

FIG. 6 is a block diagram illustrating the structure of an apparatus for generating a clock for reading data.

With reference to FIG. 6, a maximum mark length detection unit 200 detects a maximum mark length D201 within a certain period of time, among mark lengths of data D200 which have been read from an optical disc by an optical pickup, and outputs the maximum mark length D201. A mark length is the length of continuous 0s or 1s included in data. For example, in a sequence {1111110001111}, the respective mark lengths are 6T, 3T, and 4T (T: cycle).

A PLL (Phase Locked Loop) 201 generates a read clock D202 which is a clock for reading data. The frequency of the read clock D202 varies according to a control pulse D204 supplied from a frequency comparator 203.

A frequency divider 202 multiplies the cycle of the read clock D202 by an integer, thereby to frequency-divide the read clock D202.

A frequency comparator 203 compares the length (cycle) of the maximum mark length D201 with the length of one cycle of the clock D203 that is frequency-divided by the frequency divider 202, and outputs a control pulse D204 to the PLL 201 to make these lengths equal.

A playback signal processing unit 204 performs demodulation, gate signal processing and the like, on the data D200.

Next, the operation of the clock generation apparatus will be described.

Initially, the data D200 which is binarized into 0s or 1s with respect to an RF signal reproduced from the optical disc is inputted to the maximum mark length detection unit 200, and the mark lengths in the data D200 are successively counted with a fixed clock. When a predetermined period of time has passed, a maximum mark length is detected.

In the data format of a DVD-ROM, a maximum mark length is a width of 14T, in which 14 pieces of 0s or 1s are arranged. Further, as shown in FIG. 7, a pattern of 14T+4T (=18T) existing in the binary data D200 is called a sync pattern, and this is a specific mark existing in every frame (a minimum unit in which data are written: 1 frame=1488T).

That is, when detection of a maximum mark length is carried out within a predetermined period of time that is longer than one frame, the detected maximum mark length has a width of 14T.

The outputted maximum mark length D201 is inputted to the frequency comparator 203. On the other hand, the read clock D202 outputted from the PLL 201 is frequency-divided by the frequency divider 202 so that it may be compared with the frequency (cycle) of the maximum mark length D201. That is, when the maximum mark length is 14T, the read clock D202 is frequency-divided so that its cycle is multiplied by 14. The cycle (frequency) of the maximum mark length D201 and the cycle (frequency) of the frequency-divided clock D203 are compared by the frequency comparator 203. When the cycle of the maximum mark length D201 is shorter than the cycle of the frequency-divided clock D203 (i.e., when the frequency of the maximum mark length D201 is higher than the frequency of the clock D203), the frequency comparator 203 outputs a frequency control pulse D204 for increasing the frequency of the read clock D202. When the cycle of the maximum mark length D201 is longer than the cycle of the frequency-divided clock D203 (i.e., when the frequency of the maximum mark length D201 is lower than the frequency of the clock D203), the comparator 203 outputs a frequency control pulse D204 for reducing the frequency of the read clock D202.

By performing the above-mentioned control, the read clock D202 can always be maintained at the frequency according to the data frequency.

Using the read clock D202 so generated, the playback signal processing unit 204 reads the binary data D200, and subjects the binary data D200 to demodulation, gate signal processing, and the like.

The read clock D202 in FIG. 7 shows its controlled state. Although the read clock D202 does not match the frequency of the data D200 before performing the above-mentioned control, the read clock D202 matches the frequency of the data D200 after the control has been continued.

Next, the maximum mark length detection unit 200 will be described.

As a method for detecting a maximum mark length, the maximum mark length detection apparatus 200 usually employs a method as follows. That is, a mark length is measured, and the measured mark length is compared with a previously detected maximum mark length. When the measured mark length is longer than the maximum mark length, the measured mark length is stored in a register as a latest maximum mark length. On the other hand, when the measured mark length is shorter than the previous maximum mark length, the value stored in the register is maintained. By employing this method, the value stored in the register is always the maximum mark length.

FIG. 8 is a block diagram illustrating the structure of the conventional maximum mark length detection apparatus.

With reference to FIG. 8, a mark length measuring unit 100 measures a mark length of a binary signal which is read from the optical disc. A maximum mark length storage register 101 stores the measured mark length D100 on the basis of a write enable signal D102, and outputs a stored maximum mark length D101. A comparator 102a compares the measured mark length D100 with the maximum mark length D101, and outputs the write enable signal D102 to the maximum mark length storage register 101 when the measured mark length D100 is longer than the maximum mark length D101.

Next, the operation of the maximum mark length detection unit 200 will be described.

Initially, an RF signal outputted from the optical disc is binarized, and the binary signal is inputted to the mark length measuring unit 100. Then, a mark length is measured, and a measured mark length D100 indicating the measured mark length is outputted.

The comparator 102a compares the measured mark length D100 with the maximum mark length D101 stored in the maximum mark length storage register 101, and outputs a write enable signal D102 to the maximum mark length storage register 101 when the measured mark length D100 is longer than the maximum mark length D101 (i.e., when measured mark length D100>maximum mark length D101). Then, the maximum mark length storage register 101 stores the measured mark length D100. In the comparison by the comparator 102a, when the maximum mark length D101 is longer than the measured mark length D100, the comparator 102 outputs no write enable signal D102. Accordingly, the maximum mark length storage register 101 does not store the measured mark length D100, and the value stored in the maximum mark length storage register 101 is maintained.

In this way, the maximum mark length storage register 101 always holds the maximum mark length among the mark lengths which have previously been measured by the mark length measuring unit 100, and outputs the maximum mark length D101.

FIG. 9 is a timing chart for explaining the operation of the conventional maximum mark length detection unit.

For example, since the maximum mark length D101 is "5" when the measured mark length D100 is "11", the comparator 102a judges that D100>D101, and outputs a write enable signal D102. That is, the write enable signal D102 becomes high as shown in FIG. 9. Then, the maximum mark length storage register 101 captures "11" as the measured mark length D100, and the maximum mark length D101 becomes "11". In this way, in the example shown in FIG. 9, the value of the maximum mark length D101 eventually becomes "50". Although the data widths of the measured mark lengths D100 are equal in FIG. 9, this is for the convenience in description. Actually, the mark lengths are counted with a fixed clock, and a newly measured mark length D100 is outputted at every edge of a mark of an input signal, and therefore, the data widths vary among the mark lengths. The same holds true with regard to other timing charts.

In the conventional maximum mark length detection apparatus, however, when there is a flaw or contamination on the optical disc, the flaw or contamination might be detected as a maximum mark length by mistake. In this case, since the maximum mark length in the sync pattern is not detected, the read clock is not correctly controlled, whereby the maximum mark length detection apparatus cannot appropriately read the signal from the optical disc.

SUMMARY OF THE INVENTION

The present invention is made to solve the above-described problems and has for its object to provide a mark length selection apparatus and a mark length selection method which are able to select mark lengths of a signal that has previously been recorded on an optical disc while eliminating mark lengths caused by flaws or contamination on the optical disc, as well as a maximum mark length detection apparatus and a maximum mark length detection method which are able to detect a maximum mark length from the selected mark lengths.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a mark length selection apparatus comprises: a mark length measuring unit for measuring mark lengths of a signal which is read from an optical disc; and a mark length selection unit for dividing one of continuous two mark lengths by the other mark length, which mark lengths are measured by the mark length measuring unit, and selecting some mark lengths from the mark lengths measured by the mark length measuring unit, on the basis of a result of comparison performed between a result of the division and a predetermined threshold value, and outputting the selected mark lengths. Therefore, mark lengths caused by contamination or flaws on the optical disc, i.e., improper mark lengths longer than normal mark lengths, are eliminated, whereby mark lengths of a signal which has previously been recorded on the optical disc can be selected and outputted.

According to a second aspect of the present invention, in the mark length selection apparatus according to the first aspect, the predetermined threshold value is a value obtained by dividing a maximum mark length with a minimum mark length, which mark lengths are included in a signal recorded on the optical disc.

According to a third aspect of the present invention, in the mark length selection apparatus according to the first aspect, the mark length selection unit comprises: a first storage means for storing a mark length measured by the mark length measuring unit and, when a new mark length is measured, outputting the stored mark length to store the new mark length instead of the outputted mark length; a comparator for dividing, when a new mark length is measured, the mark length outputted from the first storage means with the measured mark length, and outputting a write enable signal when a result of the division is smaller than a predetermined threshold value; and a second storage means for temporarily storing the mark length outputted from the first storage means, and outputting the mark length, on the basis of the write enable signal.

According to a fourth aspect of the present invention, in the mark length selection apparatus according to the first aspect, the mark length selection unit comprises: a first storage means for storing a mark length measured by the mark length measuring unit and, when a new mark length is measured, outputting the stored mark length to store the new mark length instead of the outputted mark length; a comparator for dividing, when a new mark length is measured, the measured mark length with the mark length outputted from the first storage means, and outputting a write enable signal when a result of the division is smaller than a predetermined threshold value; and a second storage means for temporarily storing the mark length measured by the mark length measuring means, and outputting the mark length, on the basis of the write enable signal.

According to a fifth aspect of the present invention, a maximum mark length detection apparatus comprises: a mark length measuring unit for measuring mark lengths of a signal which is read from an optical disc; a mark length selection unit for dividing one of continuous two mark lengths by the other mark length, which mark lengths are measured by the mark length measuring unit, and selecting some mark lengths from the mark lengths measured by the mark length measuring unit, on the basis of a result of comparison performed between a result of the division and a predetermined threshold value, and outputting the selected mark lengths; and a maximum mark length detection unit for detecting a maximum mark length which is the longest mark length among the mark lengths outputted from the mark length selection unit. Therefore, mark lengths caused by contamination or flaws on the optical disc, i.e., improper mark lengths longer than normal mark lengths, are eliminated, whereby mark lengths of a signal which has previously been recorded on the optical disc can be selected, and a maximum mark length can be detected from the selected mark lengths.

According to a sixth aspect of the present invention, in the maximum mark length detection apparatus according to the fifth aspect, the predetermined threshold value is a value obtained by dividing a maximum mark length with a minimum mark length, which mark lengths are included in a signal recorded on the optical disc.

According to a seventh aspect of the present invention, in the maximum mark length detection apparatus according to the fifth aspect, the mark length selection unit comprises: a first storage means for storing a mark length which is measured by the mark length measuring unit and, when a new mark length is measured, outputting the stored mark length to store the new mark length instead of the outputted mark length; a first comparator for dividing, when a new mark length is measured, the mark length outputted from the first storage means with the measured mark length, and outputting a first write enable signal when a result of the division is smaller than a predetermined threshold value; and a second storage means for temporarily storing the mark length outputted from the first storage means, and outputting the mark length, on the basis of the first write enable signal.

According to an eighth aspect of the present invention, in the maximum mark length detection apparatus according to the fifth aspect, the mark length selection unit comprises: a first storage means for storing a mark length measured by the mark length measuring unit and, when a new mark length is measured, outputting the stored mark length to store the new mark length instead of the outputted mark length; a first comparator for dividing, when a new mark length is measured, the measured mark length with the mark length outputted from the first storage means, and outputting a first write enable signal when a result of the division is smaller than a predetermined threshold value; and a second storage means for temporarily storing the mark length measured by the mark length measuring unit, and outputting the mark length, on the basis of the first write enable signal.

According to a ninth aspect of the present invention, in the maximum mark length detection apparatus according to the fifth aspect, the maximum mark length detection unit comprises: a maximum mark length storage means for storing a mark length outputted from the mark length selection unit, on the basis of a second write enable signal; and a second comparator for comparing the mark length outputted from the mark length selection unit with the mark length stored in the maximum mark length storage means, and outputting the second write enable signal when the outputted mark length is longer than the mark length stored in the maximum mark length storage means.

According to a tenth aspect of the present invention, a mark length selection method comprises: a division step of dividing one of continuous two mark lengths by the other mark length, which mark lengths are included in a signal read from an optical disc; and a selection step of comparing a result of the division in the division step with a predetermined threshold value, and selecting some mark lengths from mark lengths included in the signal read from the optical disc, on the basis of a result of the comparison, and then outputting the selected mark lengths. Therefore, mark lengths caused by contamination or flaws on the optical disc, i.e., improper mark lengths longer than normal mark lengths, are eliminated, whereby mark lengths of a signal which has previously been recorded on the optical disc can be selected and outputted.

According to an eleventh aspect of the present invention, a maximum mark length detection method comprises: a division step of dividing one of two continuous mark lengths by the other mark length, which mark lengths are included in a signal read from an optical disc; a selection step of comparing a result of the division in the division step with a predetermined threshold value, and selecting some mark lengths from mark lengths included in the signal read from the optical disc, on the basis of a result of the comparison, and then outputting the selected mark lengths; and a maximum mark length detection step of comparing each of the mark lengths selected in the selection step, with a maximum mark length among mark lengths which have previously been measured, and setting the selected mark length as a maximum mark length when the selected mark length is longer than the maximum mark length. Therefore, mark lengths caused by contamination or flaws on the optical disc, i.e., improper mark lengths longer than normal mark lengths, are eliminated, whereby mark lengths of a signal which has previously been recorded on the optical disc can be selected, and a maximum mark length can be detected from the selected mark lengths.

DETAILED DESCRIPTION OF THE PREFERRED EMBODIMENTS

[Embodiment 1]

Hereinafter, a maximum mark length detection apparatus and a maximum mark length detection method according to a first embodiment of the present invention will be described with reference to drawings.

Figure 1:
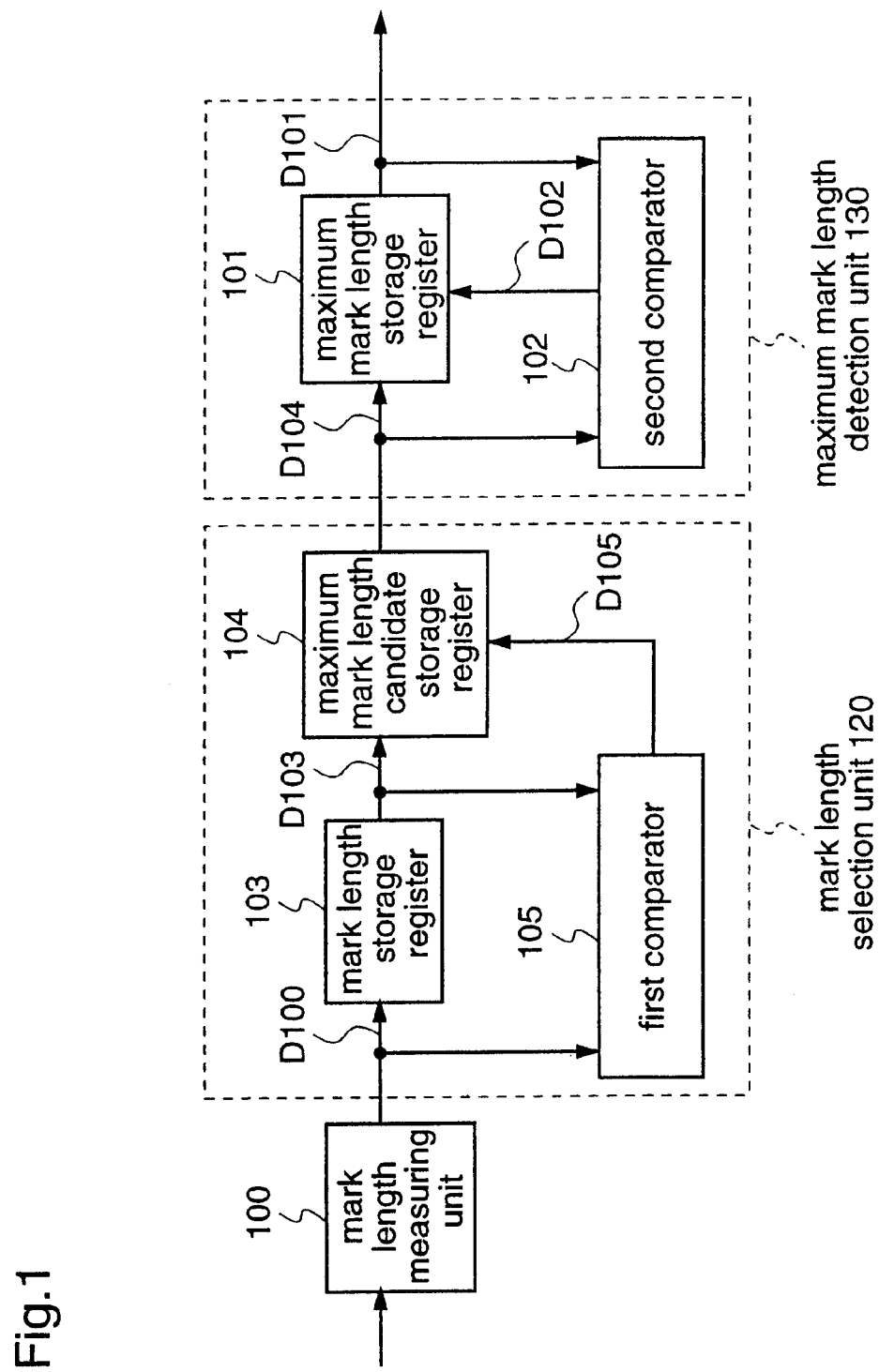
FIG. 1 is a block diagram illustrating the structure of a maximum mark length detection apparatus according to a first embodiment of the present invention.

FIG. 1 is a block diagram illustrating the structure of a maximum mark length detection apparatus according to the first embodiment of the invention. In FIG. 1, a mark length measuring unit 100 and a maximum mark length storage register 101 are identical to those of the conventional apparatus, and a second comparator 102 is identical to the comparator 102a of the conventional apparatus, and therefore, descriptions thereof will be omitted.

A mark length selection unit 120 divides one of continuous two mark lengths by the other mark length, which mark lengths have been measured by the mark length measuring unit 100, and selects mark lengths to be outputted to a maximum mark length detector 130, from mark lengths measured by the mark length measuring unit 100, on the basis of a result of comparison performed between a result of the division and a threshold value. The mark length selection unit 120 comprises a mark length storage register 103, a maximum mark length candidate storage register 104, and a first comparator 105.

The mark length storage register 103 stores the mark length measured by the mark length measuring unit 100 and, when a new mark length is measured, the register 103 outputs the stored mark length to store the new mark length instead of the outputted mark length.

When a new mark length is measured, the first comparator 105 divides the stored mark length D103 outputted from the mark length storage register 103, by the measured mark length D100, and outputs a write enable signal D105 when a result of the division is smaller than a predetermined threshold value.

The maximum mark length candidate storage register 104 temporarily stores the stored mark length D103 outputted from the mark length storage register 103, and outputs the stored mark length D103 as a selected mark length D104, on the basis of the write enable signal D105.

The maximum mark length detection unit 130 detects a maximum mark length from the mark lengths outputted from the mark length selection unit 120, and outputs the detected maximum mark length. The maximum mark length detection unit 130 comprises a maximum mark length storage register 101, and a second comparator 102.

Next, the operation of the maximum mark length detection unit 130 according to the first embodiment will be described.

Figure 2:
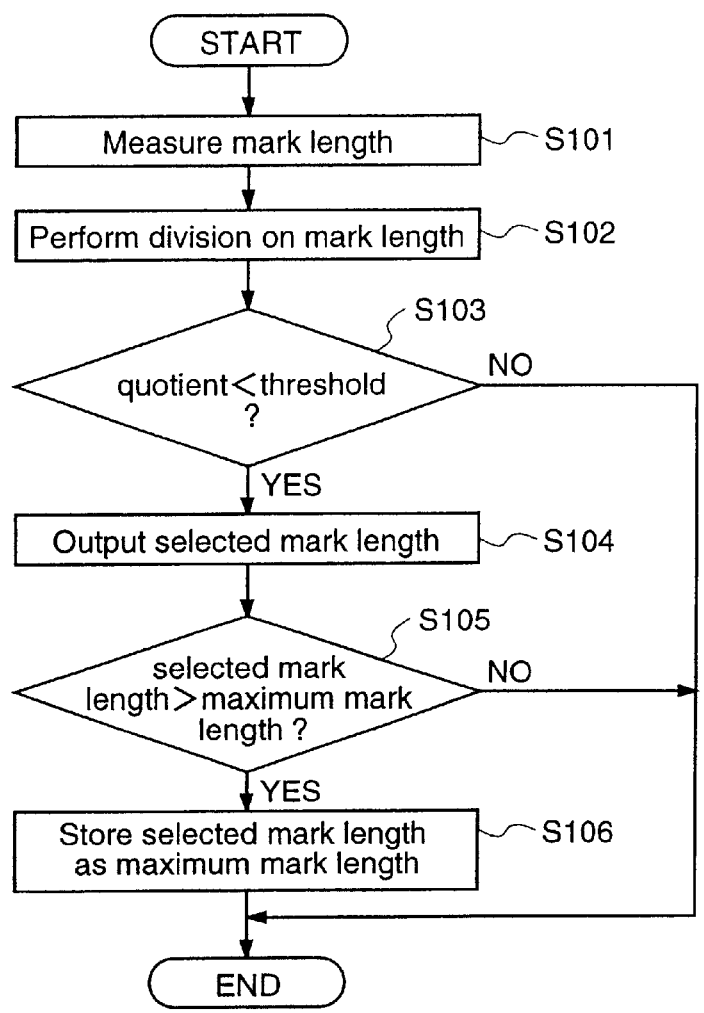
FIG. 2 is a flowchart illustrating the operation of the maximum mark length detection apparatus according to the first embodiment.

FIG. 2 is a flowchart illustrating the operation of the maximum mark length detection unit 130.

With reference to FIG. 2, initially, when a binary signal which is read from the optical disc is inputted to the mark length measuring unit 100, the mark length measuring unit 100 measures a mark length of the binary signal (step S101). Then, the mark length measuring unit 100 outputs the measured mark length D100. The measured mark length D100 is inputted to the mark length storage register 103 and to the first comparator 105, and a stored mark length D103 which has been stored in the register 103 is outputted from the mark length storage register 103.

The first comparator 105 divides the stored mark length D103 with the measured mark length D100 (step S102). Then, the first comparator 105 judges whether a result of the division (D103/D100) is smaller than a predetermined threshold value or not (step S103). When the result of the division is smaller than the predetermined value, the comparator 105 outputs a write enable signal D105. On receipt of the write enable signal D105, the maximum mark length candidate storage register 104 stores the stored mark length D103 supplied from the mark length storage register 103, and outputs it as a selected mark length D104 (step S104). On the other hand, when the result of the division is not smaller than the threshold value, no write enable signal D105 is outputted, and the stored mark length D103 at this time is not outputted. Thereby, the mark lengths are sorted by the mark length selection unit 120. That is, even when a long mark length caused by contamination or a flaw on the optical disc, which should not exist actually, is measured by the mark length measuring unit 100, this mark length is not outputted, and excluded from the mark lengths to be outputted from the mark length section unit 120. When the optical disc is of a DVD-ROM format, since mark lengths from 14T to 3T exist, a threshold value to be used by the first comparator 105 is desired to be set at about 14/3 which is a value obtained by dividing the maximum mark length (14T) by the minimum mark length (3T).

In the second comparator 102, the selected mark length D104 outputted from the mark length selection unit 120 is compared with the maximum mark length D101 stored in the maximum mark length storage register 101, i.e., the longest mark length among the mark lengths which have previously been measured (step S105). When the selected mark length D104 is longer than the maximum mark length D101, a write enable signal D102 is outputted, and the selected mark length D104 is stored in the maximum mark length storage register 101 as a latest maximum mark length D101 (step S106). When the selected mark length D104 is not longer than the maximum mark length D101, no write enable signal S102 is outputted. Then, the selected mark length D104 is not stored in the maximum mark length storage register 101, and the maximum mark length D101 stored in the maximum mark length storage register 101 is maintained. In this way, the maximum mark length D101 is always the maximum mark length among the mark lengths outputted from the mark length selection unit 120.

Figure 3:
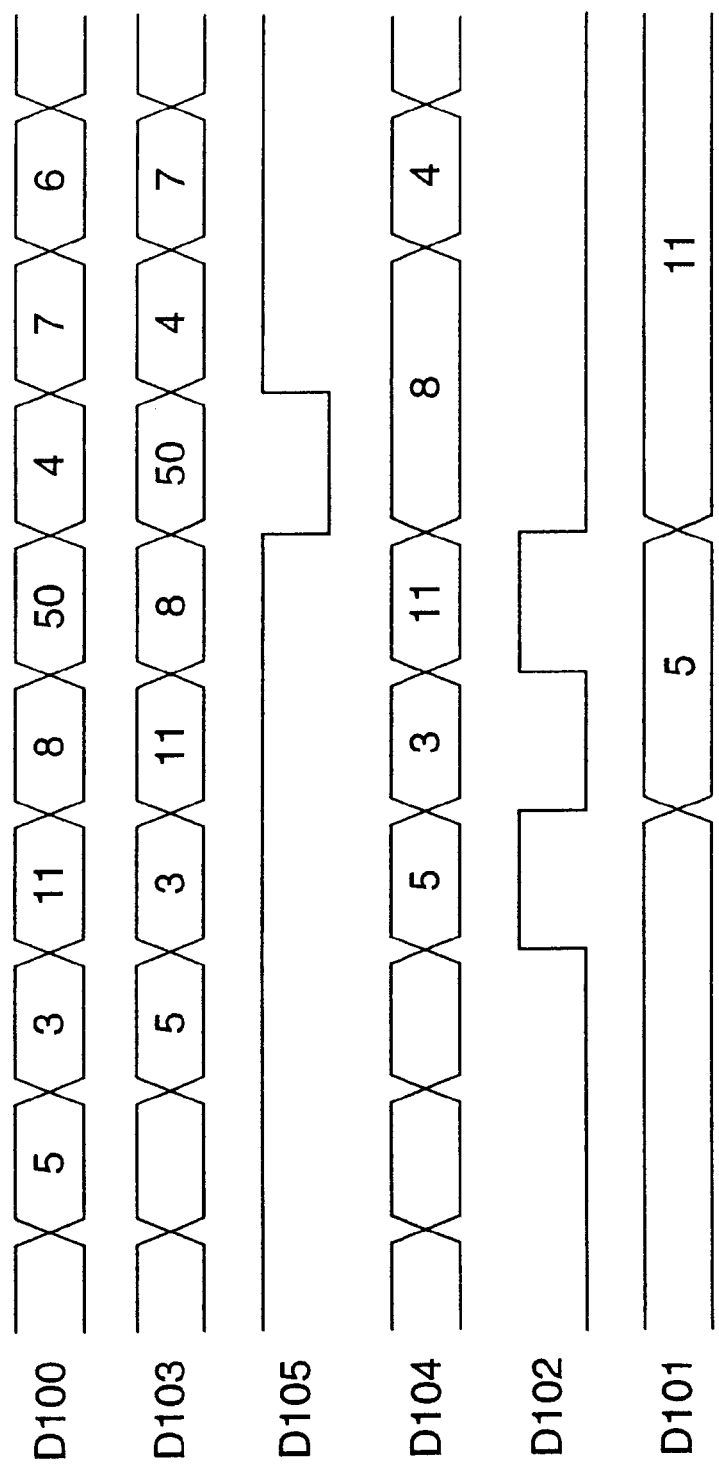
FIG. 3 is a timing chart illustrating an example of operation of the maximum mark length detection apparatus according to the first embodiment.

FIG. 3 is a timing chart for explaining an example of operation of the maximum mark length detection apparatus according to the first embodiment. In the timing chart shown in FIG. 3, the threshold value is "5".

For example, when the measured mark length D100 is "11", the stored mark length D103 is "3", and (D103/D100) becomes 3/11≈0.27. As this value is smaller than the threshold value "5", the write enable signal D105 is high. Since the mark length is updated at every edge of a mark of an inputted signal, the mark length "3" is stored in the maximum mark length candidate storage register 104 at a timing when the measured mark length D100 becomes "8", and outputted from the mark length selection unit 120. On the other hand, when the measured mark length D100 is "4", the stored mark length D103 is "50", and (D103/D100) becomes 50/4≈12.5. Since this value is larger than the threshold value "5", the write enable signal D105 becomes low. Therefore, even when the mark length "50" caused by contamination or flaw on the optical disc is measured by the mark length measuring unit 100, this mark length "50" is not stored in the maximum mark length candidate storage register 104, and it is not outputted from the mark length selection unit 120. So, the eventual maximum mark length D101 is "11".

As described above, the maximum mark length detection apparatus or method according to the first embodiment is provided with the mark length selection unit 120 which divides one of continuous two mark lengths by the other mark length, which mark lengths have been measured by the mark length measuring unit 100, and selects some mark lengths from mark lengths measured by the mark length measuring unit 100, on the basis of a result of comparison performed between a result of the division and a threshold value, and a maximum mark length is detected from the mark lengths outputted from the mark length selection unit 120. Therefore, mark lengths caused by contamination or flaws on the optical disc, i.e., improper mark lengths longer than normal mark lengths, are eliminated, and only mark lengths of a signal which has previously been recorded on the optical disc are selected, whereby a maximum mark length can be detected from the proper mark lengths. Accordingly, when the maximum mark length detection apparatus is incorporated into an apparatus for generating a read clock, the clock generation apparatus is prevented from generating a read clock on the basis of an improper maximum mark length, and it can generate a proper read clock according to the actual rotation speed of the optical disc.

[Embodiment 2]

Hereinafter, a maximum mark length detection apparatus and a maximum mark length detection method according to a second embodiment of the present invention will be described with reference to drawings.

Figure 4:
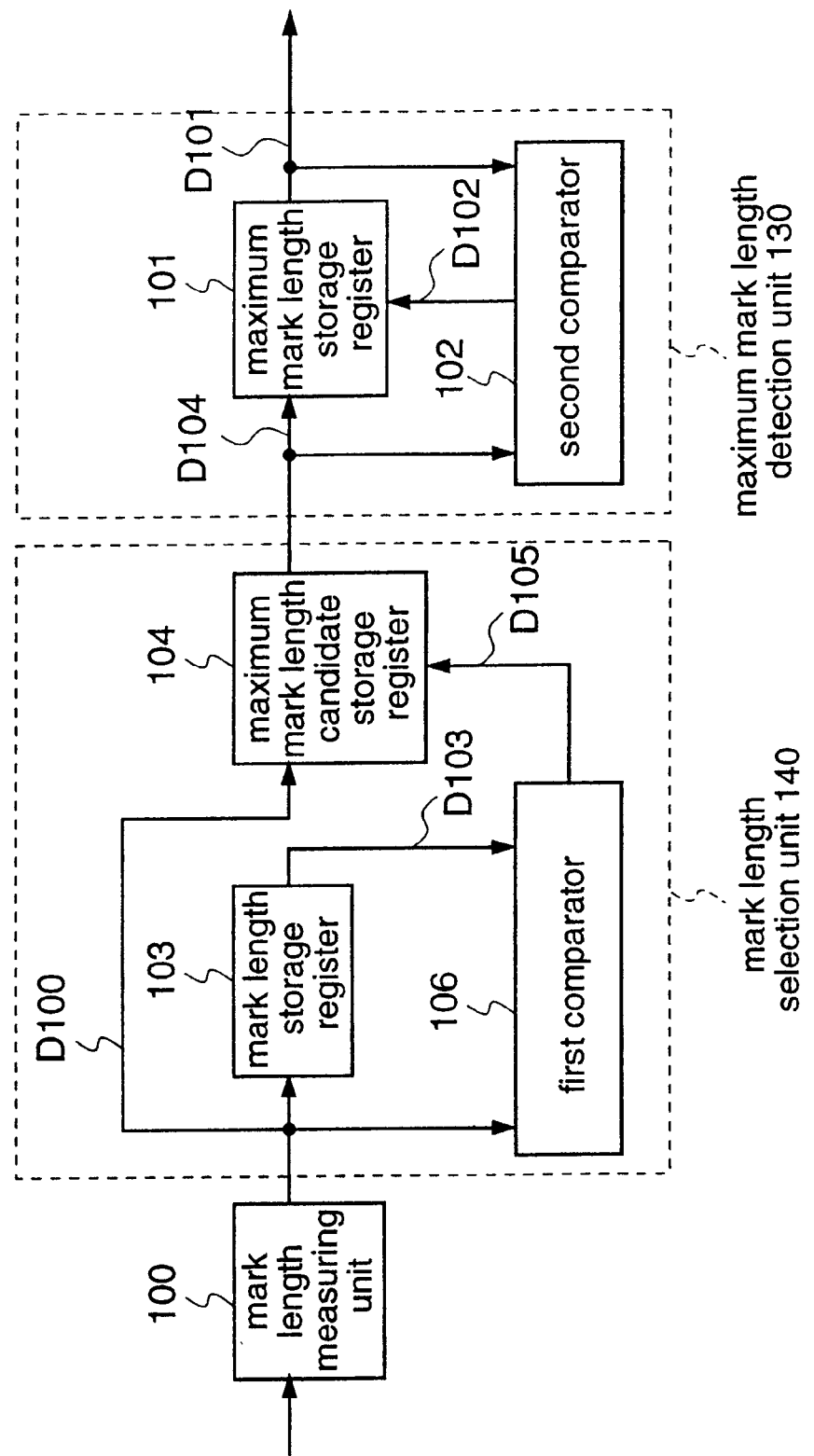
FIG. 4 is a block diagram illustrating the structure of a maximum mark length detection apparatus according to a second embodiment of the present invention.

FIG. 4 is a block diagram illustrating the structure of a maximum mark length detection apparatus according to the second embodiment. In FIG. 4, the constituents other than a first comparator 106 and a mark length selection unit 140 are identical to those already described for the first embodiment and, therefore, descriptions thereof will be omitted.

As in the case of the mark length selection unit 120 according to the first embodiment, the mark length selection unit 140 divides one of continuous two mark lengths by the other mark length, which mark lengths have been measured by the mark length measuring unit 100, and selects mark lengths to be outputted to the maximum mark length detector 130, from mark lengths measured by the mark length measuring unit 100, on the basis of a result of comparison performed between a result of the division and a threshold value. The mark length storage register 103 and the maximum mark length candidate storage register 104 are identical to those described for the first embodiment except that the maximum mark length candidate storage register 104 receives the measured mark length D100 instead of the stored mark length D103.

When a new mark length is measured, the first comparator 106 divides the measured mark length D100 by the stored mark length D103 which is outputted from the mark length storage register 103, and outputs a write enable signal D105 when a result of the division is smaller than a predetermined threshold value.

The operation of the maximum mark length detection apparatus according to the second embodiment is almost identical to the operation of the maximum mark length detection apparatus according to the first embodiment shown in FIG. 2 and, therefore, repeated description is not necessary. However, this second embodiment differs from the first embodiment in the following respects. In the step of dividing the mark length (step S102), the measured mark length D100 is divided by the stored mark length D103 in this second embodiment, while the stored mark length D103 is divided by the measured mark length D100 in the first embodiment. Further, the mark length to be inputted to the maximum mark length candidate storage register 104 is the measured mark length D100 in this second embodiment, while it is the stored mark length D103 in the first embodiment.

Figure 5:
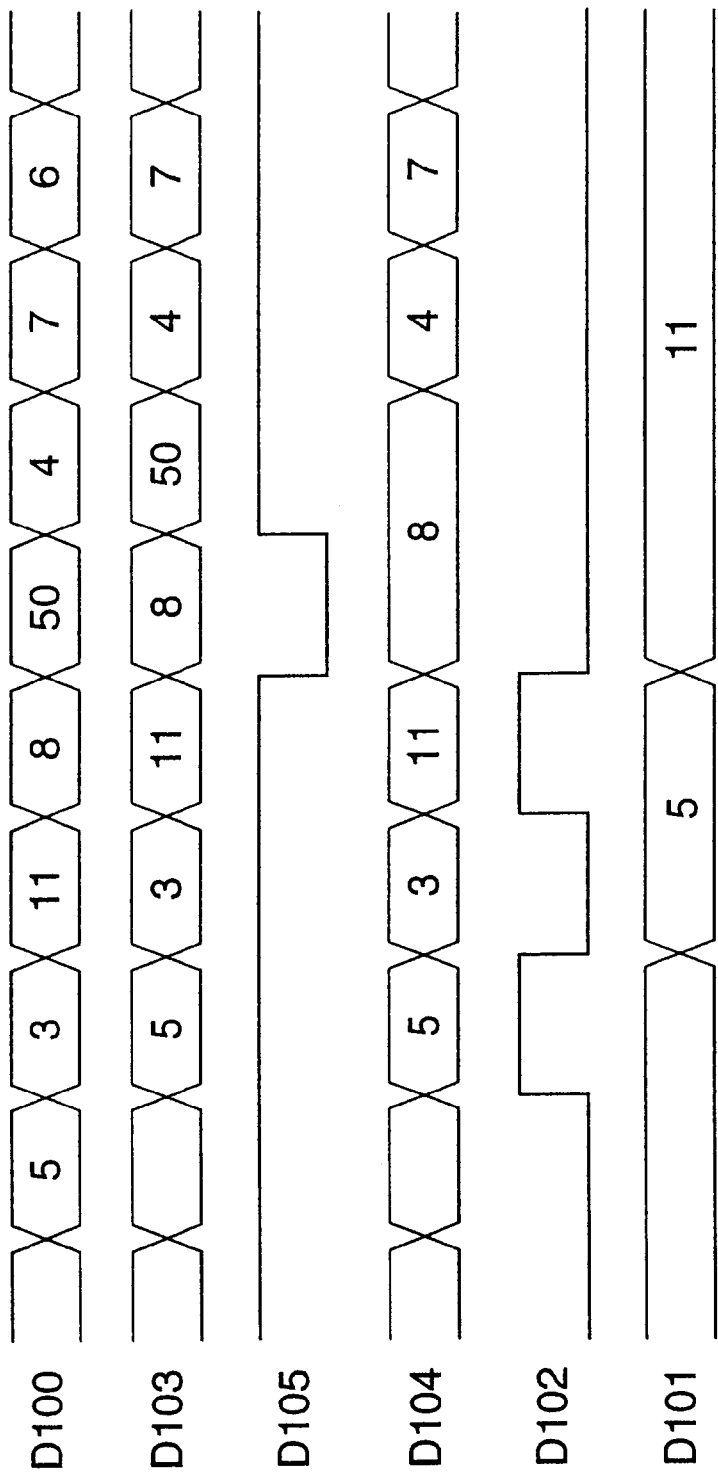
FIG. 5 is a timing chart illustrating an example of operation of the maximum mark length detection apparatus according to the second embodiment.
Figure 6:
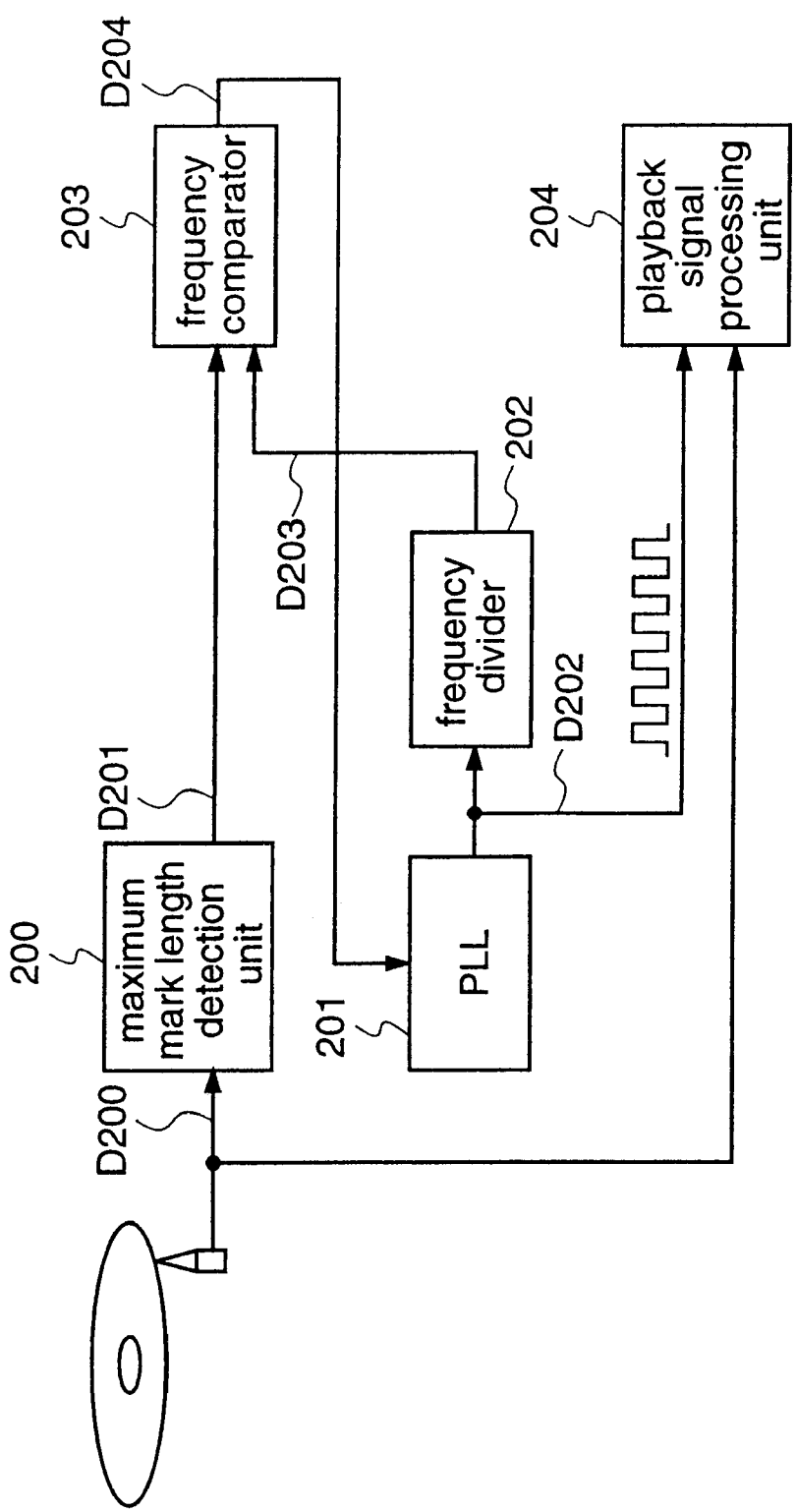
FIG. 6 is a block diagram illustrating the structure of an apparatus for generating a read clock.
Figure 7:
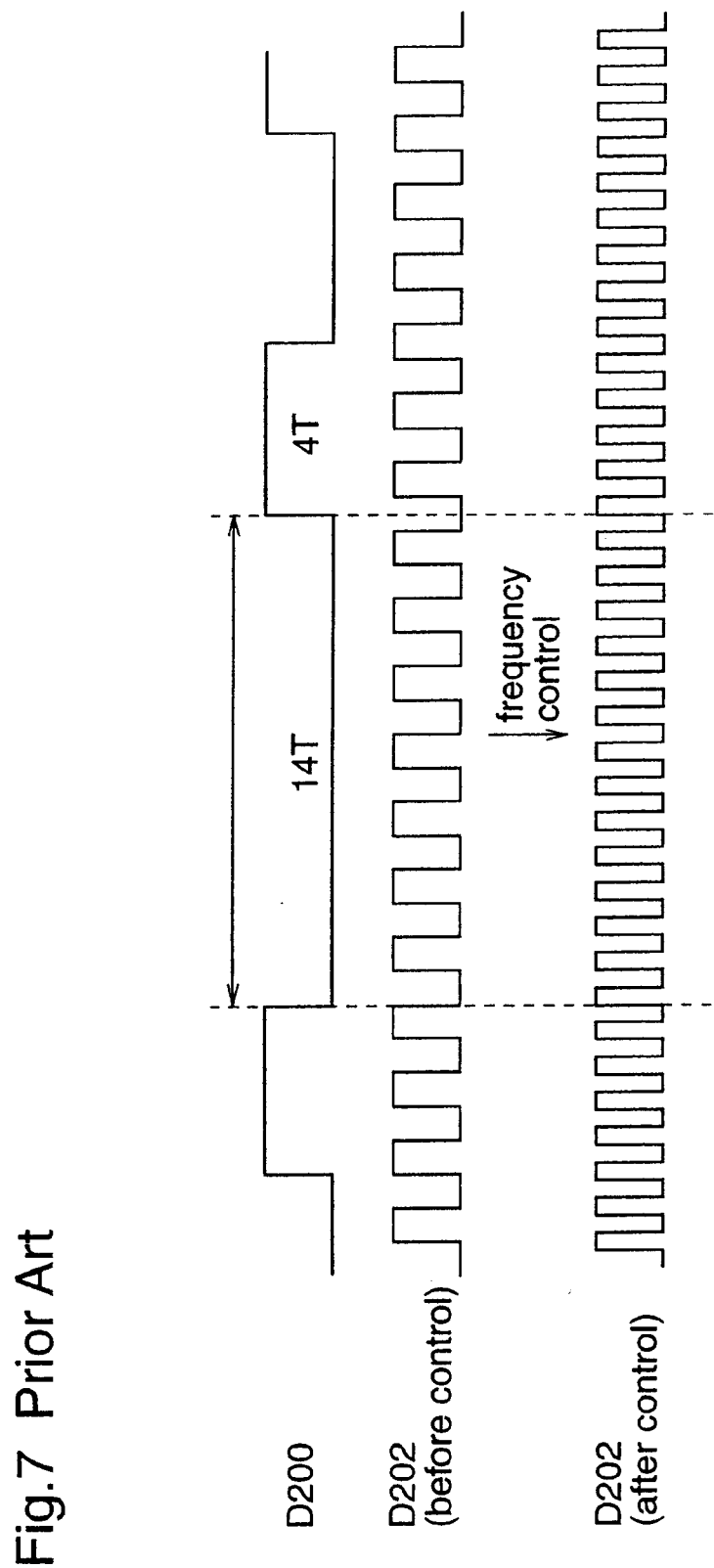
FIG. 7 is a diagram for explaining control of the read clock.
Figure 8:
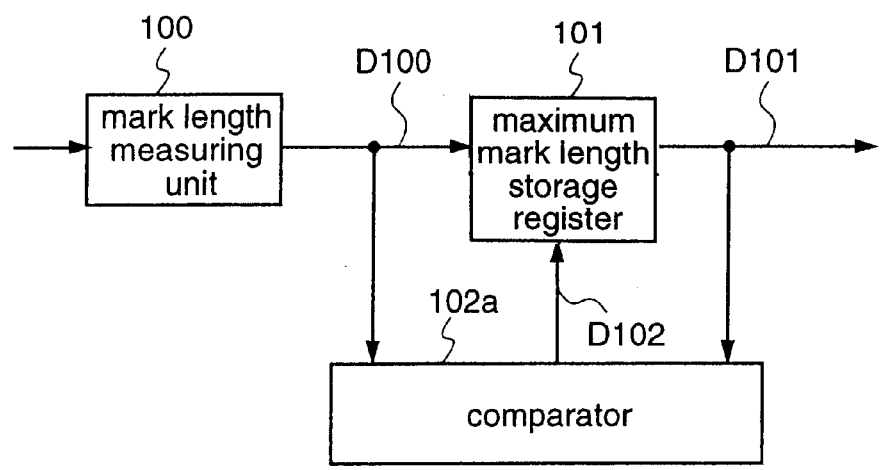
FIG. 8 is a block diagram illustrating the structure of a conventional maximum mark length detection apparatus.
Figure 9:
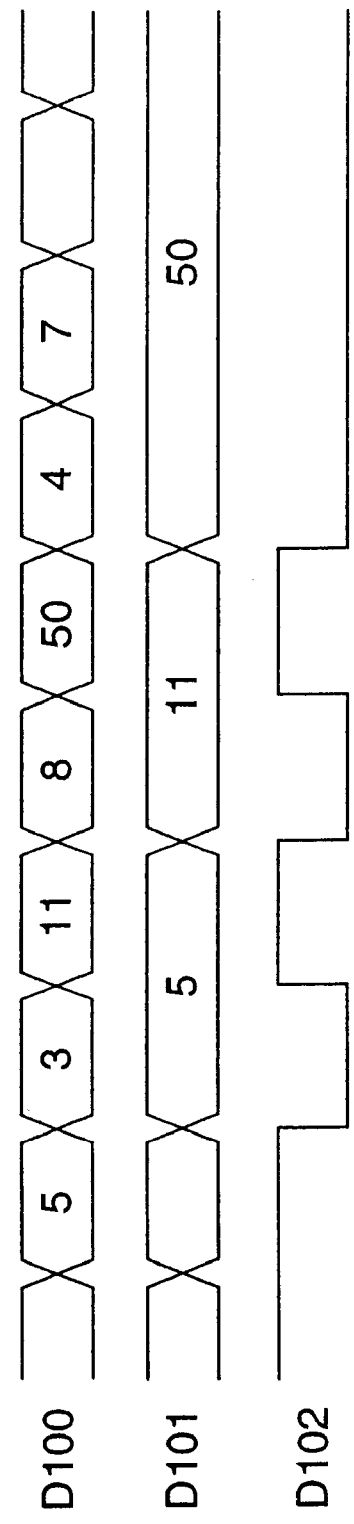
FIG. 9 is a timing chart for explaining the operation of the conventional maximum mark length detection apparatus.

FIG. 5 is a timing chart for explaining an example of operation of the maximum mark length detection apparatus according to the second embodiment. In the timing chart shown in FIG. 5, the threshold value is "5".

For example, when the measured mark length D100 is "11", the stored mark length D103 is "3", and (D100/D103) becomes 11/3≈3.67. Since this value is smaller than the threshold value "5", the write enable signal D105 is high. Then, the mark length "11" is stored in the maximum mark length candidate storage register 104, and outputted from the mark length selection unit 120. On the other hand, when the measured mark length D100 is "50", the stored mark length D103 is "8", and (D100/D103) becomes 50/8≈6.25. Since this value is larger than the threshold value "5", the write enable signal D105 becomes low. Therefore, even when the mark length "50" caused by contamination or flaw on the optical disc is measured by the mark length measuring unit 100, this mark length "50" is not stored in the maximum mark length candidate storage register 104, and it is not outputted from the mark length selection unit 120. So, the eventual maximum mark length D101 becomes "11".

When the timing chart shown in FIG. 5 is compared with the timing chart shown in FIG. 3 according to the first embodiment, in this second embodiment, the mark length to be inputted to the maximum mark length candidate storage register 104 is the measured mark length D100, and an improper mark length caused by contamination or the like on the optical disc is compared with a just previous mark length, whereby the timing to define the maximum mark length D101 is one cycle earlier than that in the case shown in FIG. 3.

As described above, the maximum mark length detection apparatus or method according to this second embodiment is provided with the mark length selection unit 140 which divides one of continuous two mark lengths by the other mark length, which mark lengths have been measured by the mark length measuring unit 100, and selects some mark lengths from mark lengths measured by the mark length measuring unit 100, on the basis of a result of comparison performed between a result of the division and a threshold value, and a maximum mark length is detected from the mark lengths outputted from the mark length selection unit 140. Therefore, as in the first embodiment, mark lengths caused by contamination or flaws on the optical disc, i.e., improper mark lengths longer than normal mark lengths, are eliminated, and only mark lengths of a signal which has previously been recorded on the optical disc are selected, whereby a maximum mark length can be detected from the proper mark lengths.

What is claimed is:

1. A mark length selection apparatus comprising:

a mark length measuring unit for measuring mark lengths of a signal that is read from an optical disc; and a mark length selection unit for dividing one of continuous two mark lengths by the other mark length, wherein said mark lengths are measured by the mark length measuring unit, and for selecting selected mark lengths from the mark lengths measured by the mark length measuring unit on the basis of a result of comparison performed between a result of the division and a predetermined threshold value, and for outputting the selected mark lengths.

2. The mark length selection apparatus of claim 1, wherein the predetermined threshold value is a value obtained by dividing a maximum mark length with a minimum mark length, wherein said mark lengths are included in a signal recorded on the optical disc.

3. The mark length selection apparatus of claim 1, wherein the mark length selection unit comprises:

a first storage means for storing a mark length measured by the mark length measuring unit and, when a new mark length is measured, for outputting the stored mark length and thereafter storing the new mark length;

a comparator for dividing, when a new mark length is measured, the mark length outputted from the first storage means by the new measured mark length, and for outputting a write enable signal when a result of the division is smaller than a predetermined threshold value; and a second storage means for temporarily storing the mark length outputted from the first storage means, and for outputting the mark length outputted from the first storage means, on the basis of the write enable signal.

4. The mark length selection apparatus of claim 1, wherein the mark length selection unit comprises:
- a first storage means for storing a mark length measured by the mark length measuring unit and, when a new mark length is measured, for outputting the stored mark length and thereafter storing the new mark length;
- a comparator for dividing, when a new mark length is measured, the new measured mark length by the mark length outputted from the first storage means, and for outputting a write enable signal when a result of the division is smaller than a predetermined threshold value; and
- a second storage means for temporarily storing the new mark length measured by the mark length measuring means, and for outputting the new measured mark length, on the basis of the write enable signal.

5. A maximum mark length detection apparatus comprising:
- a mark length measuring unit for measuring mark lengths of a signal that is read from an optical disc;
- a mark length selection unit for dividing one of continuous two mark lengths by the other mark length, wherein said mark lengths are measured by the mark length measuring unit, for selecting selected mark lengths from the mark lengths measured by the mark length measuring unit, on the basis of a result of comparison performed between a result of the division and a predetermined threshold value, and for outputting the selected mark lengths; and
- a maximum mark length detection unit for detecting a maximum mark length that is the longest mark length among the mark lengths outputted from the mark length selection unit.

6. The maximum mark length detection apparatus of claim 5, wherein the predetermined threshold value is a value obtained by dividing a maximum mark length by a minimum mark length, wherein said maximum and minimum mark lengths are included in a signal recorded on the optical disc.

7. The maximum mark length detection apparatus of claim 5, wherein the mark length selection unit comprises:
- a first storage means for storing a mark length that is measured by the mark length measuring unit and, when a new mark length is measured, for outputting the stored mark length and thereafter storing the new mark length instead of the outputted mark length;
- a first comparator for dividing, when a new mark length is measured, the mark length outputted from the first storage means by the measured mark length, and for outputting a first write enable signal when a result of the division is smaller than a predetermined threshold value; and
- a second storage means for temporarily storing the mark length outputted from the first storage means, and for outputting the mark length outputted from the first storage means, on the basis of the first write enable signal.

8. The maximum mark length detection apparatus of claim 5, wherein the mark length selection unit comprises:
- a first storage means for storing a mark length measured by the mark length measuring unit and, when a new mark length is measured, for outputting the stored mark length and thereafter storing the new mark length instead of the outputted mark length;
- a first comparator for dividing, when a new mark length is measured, the measured new mark length by the mark length outputted from the first storage means, and for outputting a first write enable signal when a result of the division is smaller than a predetermined threshold value; and
- a second storage means for temporarily storing the new mark length measured by the mark length measuring unit, and for outputting the mark length measured by the mark length measuring unit, on the basis of the first write enable signal.

9. The maximum mark length detection apparatus of claim 5, wherein the maximum mark length detection unit comprises:
- a maximum mark length storage means for storing a mark length outputted from the mark length selection unit, on the basis of a second write enable signal; and
- a second comparator for comparing the mark length outputted from the mark length selection unit with the mark length stored in the maximum mark length storage means, and outputting the second write enable signal when the outputted mark length is longer than the mark length stored in the maximum mark length storage means.

10. A mark length selection method comprising:
- dividing one of continuous two mark lengths by the other mark length, wherein said mark lengths are included in a signal read from an optical disc; and
- comparing a result of said dividing with a predetermined threshold value, and selecting selected mark lengths from mark lengths included in the signal read from the optical disc, on the basis of a result of the comparison, and then outputting the selected mark lengths.

11. A maximum mark length detection method comprising:
- dividing one of two continuous mark lengths by the other mark length, wherein said mark lengths are included in a signal read from an optical disc;
- comparing a result of said dividing with a predetermined threshold value, and selecting selected mark lengths from mark lengths included in the signal read from the optical disc, on the basis of a result of the comparison, and then outputting the selected mark lengths; and
- comparing each of the selected mark lengths with a maximum mark length among mark lengths that have previously been measured, and setting the selected mark length as a maximum mark length when the selected mark length is longer than the maximum mark length.

* * * * *